June 1, 1937. H. DREYFUS 2,081,988
MANUFACTURE OF LOWER ALIPHATIC ANHYDRIDES
Filed Jan. 4, 1934
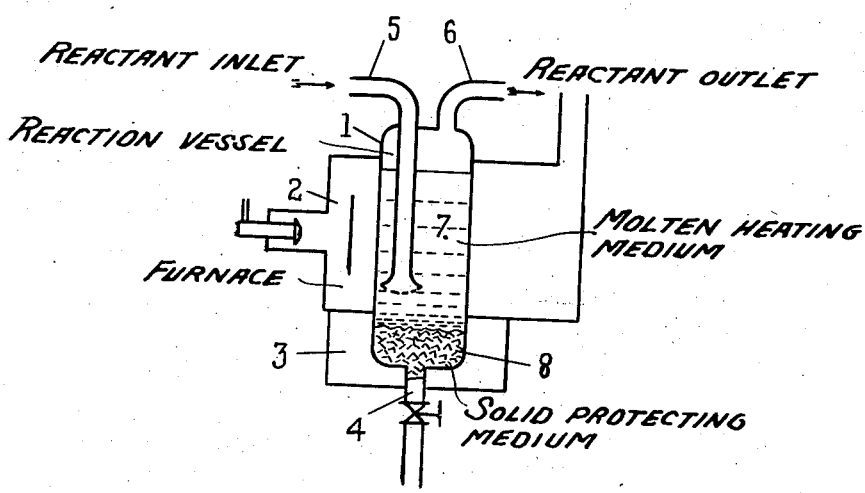
HENRY DREYFUS
INVENTOR
ATTORNEYS Patented June 1, 1937

2,081,988

UNITED STATES PATENT OFFICE 2,081,988

MANUFACTURE OF LOWER ALIPHATIC ANHYDRIDES

Henry Dreyfus, London, England

Application January 4, 1934, Serial No. 705,217
In Great Britain January 10, 1933

6 Claims. (Cl. 260—123)

This invention relates to processes in which liquid media are employed.

In many processes baths of materials in the molten state are employed at high temperatures, for instance such baths of molten materials are used as heating media and/or as catalysts in many chemical processes. In such processes serious deterioration of the reaction vessels employed for containing the liquid or molten materials is liable to occur, very often in a relatively short space of time, particularly when the vessels are constructed of metal and the molten material is of a salt-like or acid character. This deterioration, which may be due to the corrosive nature of the molten material and/or to the high temperatures employed, often results in the collapse of the bottoms of the reaction vessels where the deterioration is usually most marked. The deterioration is particularly noticeable in endothermic chemical processes carried out at high temperatures, where the necessary heat is supplied to the molten materials through the walls of the vessel containing them, since in these cases the vessel itself must be maintained at a temperature which is even higher than that at which the process is being carried out. Furthermore, usually in chemical reactions employing molten baths very little reaction takes place in the bottom of the vessel, and hence very little heat is extracted from the materials there, so that the highest temperature in the vessel is at the bottom wall thereof.

In accordance with the present invention, such processes are effected in such a manner that the bottom wall of the reaction vessel is maintained at a lower temperature than that of the main body of molten medium, and is protected from contact with the molten medium by a layer of material in the solid state. By this means the above-mentioned deterioration can be considerably minimized. The layer of material in the solid state can, most suitably, be of the same composition as the molten medium.

The invention is particularly concerned with processes in which a vaporous or gaseous chemical compound, or a mixture of chemical compounds, is passed in a stream through the molten medium.

As above indicated it is the bottom of the vessel which is subject to the greatest deterioration. Hence when heat is supplied to the body of the molten material, as will be the case if the process which is being carried out is a chemical process which is endothermic or is not sufficiently exothermic to maintain the temperature of the molten material, it is preferred to supply the heat through the side of the vessel and to maintain the bottom of the vessel out of contact with the heating means. Thus the vessel may be mounted in a furnace through the bottom of which the vessel containing the molten material projects. In this manner the lower part of the vessel may usually be maintained at a sufficiently low temperature, although additional cooling means may be provided if desired. When employing this method of operation it is preferred to provide the vessel with auxiliary heating means to enable the solid material provided in the bottom of the vessel, e. g. a solidified layer of the material employed in the molten state, to be melted when it is desired to empty the vessel; in order to facilitate emptying of the vessel, an outlet at the bottom thereof may also be provided. If desired, means may be provided around the bottom wall of the reaction vessel, which means are capable of being employed both for cooling during operation of the process and for heating when it is desired to empty the reaction vessel.

Other means may, however, be adopted to ensure that the lower part of the vessel shall be maintained at a lower temperature than that of the main body of the molten material. For instance, if the necessary heat is supplied to the body of the molten material internally, for example, by means of tubes within the materials heated electrically or by means of hot gases, the material at the bottom of the vessel and also, if desired, around the sides thereof may be maintained at a lower temperature than the main body of the materials by suitably arranging the position and depth of penetration of the heating tubes.

The invention may be applied to all processes in which baths of material in the molten state are employed. As examples of chemical processes in which molten heating and/or catalyst media may be employed and to which the invention may be applied, may be mentioned the production of aliphatic anhydrides by the thermal decomposition of the corresponding aliphatic acids, the production of aliphatic acids and esters by reaction between carbon monoxide and aliphatic alcohols or their derivatives and the thermal decomposition or cracking of hydrocarbons.

The body or mixtures of bodies employed in the molten state will of course depend upon the process which is being carried out and upon the purposes to be served by the body or bodies. Of the bodies suitable for any particular process preferably those are chosen which have melting points as little below the temperature at which the process is being carried out as possible, since bodies of this type may, without complicated additional cooling means, be maintained in the solid state at the bottom of the vessel containing them or at such other parts thereof as may be desired. For instance, if acetic anhydride is being manufactured by passing the vapours of acetic acid through a bath of molten material maintained at 600 to 650° C. and contained in a vessels within a furnace, e. g. an oil-fired furnace, the temperature of the walls of the vessel will be about 800° C. If the vessel is mounted in such a manner that its base projects through the base of the furnace, the temperature at the bottom of the vessel may be maintained at 500° C. or even lower without any cooling other than the circulation of atmospheric air in contact with the base of the vessel. Hence materials having a melting point of between about 500 and 600° will be suitable in this case.

The following bodies may be mentioned as examples from which such substances or mixtures of substances suitable for the various chemical processes mentioned above may be chosen, alkali metal halides and especially eutectic mixtures thereof, alkali metal phosphates, aluminium phosphates and boric anhydrides.

It is to be understood, however, that the invention is not limited to the employment, as molten media, of materials which can be maintained in the solid state in those parts of the vessel which are kept at a lower temperature than the main body thereof. The solid materials which are employed will, of course, be of such a nature that they do not affect deleteriously the molten materials. For instance, if phosphoric acid is being employed as the reaction medium in producing acetic anhydride by thermal decomposition of acetic acid or in producing acetic acid and/or methyl acetate by the reaction of carbon monoxide upon methanol then alkali phosphates are very suitable for use as the material from which such a solid layer may be formed.

However, in putting the present invention into practice, preferably such bodies as have suitable melting points and sufficiently low thermal conductivities to enable their solid and liquid forms to exist in contact under the prevailing conditions are employed as the molten materials.

In the accompanying drawing is shown diagrammatically a suitable apparatus for carrying out the present invention.

In the drawing, the reaction vessel 1 is fitted in a furnace 2. Auxiliary heating or cooling means 3 surround the bottom wall of the reaction vessel 1 which extends beyond the furnace 2 and is provided with an outlet 4, an inlet pipe 5 for the materials undergoing reaction, and an outlet pipe 6 for the reaction products.

In operation, heat necessary to maintain the molten medium 7 in the liquid form and to effect the chemical process if it is endothermic, is supplied through the side wall of the reaction vessel 1 from the furnace 2. During the operation of the process the bottom wall of the reaction vessel 1, being outside the furnace 2, is at a lower temperature than the body of the molten medium 7. If desired, cooling may be effected with the aid of means 3 used for cooling. A layer 8 of the medium may thus be maintained in the solid state in the bottom of the vessel 1.

When it is desired to empty the reaction vessel the layer of solid material 8 is melted with the aid of the means 3 used for heating, and run off from the outlet 4.

What I claim and desire to secure by Letters Patent is:—

1. Process for the manufacture of a lower aliphatic anhydride, which comprises thermally decomposing the vapor of the corresponding acid by passage through a molten medium maintained at a high temperature by heat supplied to the molten medium through the side walls of the reaction vessel containing the same, which molten medium is corrosive to the material of said reaction vessel, maintaining the bottom wall of said reaction vessel at a lower temperature than that of the main body of molten medium and protecting said bottom wall from contact with the molten medium by means of material in the solid state of the same composition as the molten medium.

2. Process for the manufacture of a lower aliphatic anhydride, which comprises thermally decomposing the vapor of the corresponding acid by passage through a molten medium maintained at a high temperature by heat supplied to the molten medium through the side walls of the reaction vessel containing the same, which molten medium is corrosive to the material of said reaction vessel, maintaining the bottom wall of said reaction vessel at a lower temperature than that of the main body of molten medium and protecting said bottom wall from contact with the molten medium by means of material in the solid state of the same composition as the molten medium, said material having a melting point only slightly below that of the temperature of the molten medium.

3. Process for the manufacture of a lower aliphatic anhydride, which comprises thermally decomposing the vapor of the corresponding acid by passage through a molten medium maintained at a temperature of between 600 and 650° C. by heat supplied to the molten medium through the side walls of the reaction vessel containing the same, which molten medium is corrosive to the material of said reaction vessel, maintaining the bottom wall of said reaction vessel at a lower temperature than that of the main body of molten medium and protecting said bottom wall from contact with the molten medium by means of material in the solid state of the same composition as the molten medium, said material having a melting point of 500 to 600° C.

4. Process for the manufacture of acetic anhydride, which comprises thermally decomposing acetic acid vapor by passage through a molten medium maintained at a high temperature by heat supplied to the molten medium through the side walls of the reaction vessel containing the same, which molten medium is corrosive to the material of said reaction vessel, maintaining the bottom wall of said reaction vessel at a lower temperature than that of the main body of molten medium and protecting said bottom wall from contact with the molten medium by means of material in the solid state of the same composition as the molten medium.

5. Process for the manufacture of acetic anhydride, which comprises thermally decomposing acetic acid vapor by passage through a molten medium maintained at a high temperature by heat supplied to the molten medium through the side walls of the reaction vessel containing the same, which molten medium is corrosive to the material of said reaction vessel, maintaining the bottom wall of said reaction vessel at a lower temperature than that of the main body of molten medium and protecting said bottom wall from contact with the molten medium by means of material in the solid state of the same composition as the molten medium, said material having a melting point only slightly below that of the temperature of the molten medium.

6. Process for the manufacture of acetic anhydride, which comprises thermally decomposing acetic acid vapor by passage through a molten medium maintained at a temperature of between 600 and 650° C. by heat supplied to the molten medium through the side walls of the reaction vessel containing the same, which molten medium is corrosive to the material of said reaction vessel, maintaining the bottom wall of said reaction vessel at a lower temperature than that of the main body of molten medium and protecting said bottom wall from contact with the molten medium by means of material in the solid state of the same composition as the molten medium, said material having a melting point of 500 to 600° C.

HENRY DREYFUS.